United States Patent [19]

Sagawa et al.

[11] Patent Number: 5,062,522
[45] Date of Patent: Nov. 5, 1991

[54] DEVICE FOR ALIGNING ARTICLES HAVING DIFFERENT DIAMETERS AT THEIR HEAD AND TAILS ALONG A SELECTED DIRECTION OF MOVEMENT WHILE CONCURRENTLY ORIENTING THEIR HEADS EITHER FORWARDLY OR REARWARDLY RELATIVE TO THAT DIRECTION

[75] Inventors: Takayoshi Sagawa, Hiratsuka; Shichisei Tani, Yokohama; Katsuo Kato, Hiratsuka, all of Japan

[73] Assignee: Japan Tobacco Inc., Tokyo, Japan

[21] Appl. No.: 497,916

[22] Filed: Mar. 23, 1990

[30] Foreign Application Priority Data

Mar. 29, 1989 [JP] Japan .................................... 1-75045

[51] Int. Cl.⁵ .............................................. B65G 47/24
[52] U.S. Cl. ...................................... 198/400; 198/624
[58] Field of Search ........................ 198/389, 400, 624

[56] References Cited

U.S. PATENT DOCUMENTS

| 2,362,517 | 11/1944 | Woodberry | 198/389 |
| 2,790,532 | 4/1957 | Albertoli | 198/389 |
| 3,260,348 | 7/1966 | Niederer et al. | 198/389 |
| 3,369,644 | 2/1968 | Niederer | 198/389 |
| 3,517,797 | 6/1970 | Daleffe et al. | |
| 3,655,027 | 4/1972 | Douglas et al. | 198/389 X |
| 3,830,355 | 8/1974 | Verjux | 198/624 |
| 3,858,708 | 1/1975 | Hollenton et al. | 198/624 X |
| 3,889,798 | 6/1975 | Jurgens et al. | 198/624 |
| 4,362,234 | 12/1982 | McDonald et al. | 198/400 |

FOREIGN PATENT DOCUMENTS

| 2124332 | 3/1976 | Fed. Rep. of Germany . | |
| 2500562 | 6/1979 | Fed. Rep. of Germany . | |
| 0262718 | 12/1985 | Japan | 198/389 |
| 0130918 | 6/1987 | Japan | 198/389 |

Primary Examiner—D. Glenn Dayoan
Attorney, Agent, or Firm—Nixon & Vanderhye

[57] ABSTRACT

A device for aligning rod-like matters, different in diameter at their heads and tails, in a direction while locating their heads forward in this direction. The device has a drum freely rotatable in a plane along the flow of the matters and provided with a groove on and along the circumference of the drum. The groove has a width larger than the diameter of the tails of the matters but smaller than that of the heads thereof. The matters transmitted onto the upper circumference portion of the drum are hung in the groove on the circumference of the drum. Keeping their heads hooked by both side rims of the groove and located upward while leaving their tails suspended in the groove. The device also has a feed-in conveyor system and a feed-out conveyor system. The feed-in conveyor system feeds the matters to the drum successively. The feed-out conveyor system receives the matters hung in the groove at the upper circumference portion of the drum in such a way that the tails of the matters hung in the groove are contacted at first with the feed-out conveyor system. The speed of the feed-out conveyor system is different from the peripheral speed of the drum.

6 Claims, 3 Drawing Sheets

DEVICE FOR ALIGNING ARTICLES HAVING DIFFERENT DIAMETERS AT THEIR HEAD AND TAILS ALONG A SELECTED DIRECTION OF MOVEMENT WHILE CONCURRENTLY ORIENTING THEIR HEADS EITHER FORWARDLY OR REARWARDLY RELATIVE TO THAT DIRECTION

BACKGROUND OF THE INVENTION

1. Field of the Invention

The present invention relates to a device for aligning articles having different diameters at their heads and tails. More specifically, the present invention relates to a device whereby the heads of such articles are oriented either forwardly or backwardly relative to a selected conveyance direction. In an especially preferred embodiment, the invention relates to a device for aligning liquid-containing capsules, each of which is adapted to fill a cigarette filter in a direction whereby their heads are oriented forwardly relative to the conveyance direction.

2. Description of the Related Art

Accompanying FIG. 6 shows a liquid-containing capsule C which is an example of the articles that may be aligned by a device of the present invention. The capsule C comprises a cylindrical body 1 having a bottom, and a cap 2 for closing an open end of the body 1. The capsule C is filled with liquid or water, for example, and housed in a filter of the cigarette. When the capsule-housed filter of the cigarette is pressed between a user's fingers before it is lit, a part of the capsule C is broken and water in the capsule C flows to enter into fiber filaments in the filter. Components such as tar contained in the smoke can be eliminated by the water among the fiber filaments in the filter to thereby enable the cigarette to exhibit a "lighter" taste.

These capsules C are supplied from the feeder and housed in the filters of cigarettes in the course of manufacturing cigarettes. The capsules C supplied from the feeder are fed in such a manner that their axial direction is aligned with their direction of movement. However, not all of the capsules C may be aligned with their caps located forwardly or backwardly relative to their direction of movement. That is, it is more common that some of the capsules C are oriented with their caps in a forward direction while others are oriented with the caps in a backward direction. This possibility therefore makes it necessary to use a device for aligning them in their direction of movement while at the same time locating their caps in a common direction (e.g. forwardly).

One conventional alignment device uses an optical detector, for example, to detect the position of the cap of each capsule. Those capsules whose caps are located reverse are physically turned over so that they are aligned in the selected direction of movement. However, the optical detector is not entirely reliable in detecting the position of the cap of each capsule supplied and thus it sometimes is mistakenly operated by system "noise".

Another conventional alignment device has a slit at the bottom of a groove through which the capsules are conveyed. This slit has a width larger than the diameter of the body 1 of the capsule C but smaller than that of the cap 2 thereof. The body 1 of each capsule C conveyed through the groove hangs in the slit by its own weight with its cap 2 supported by means of both side rims of the slit. Therefore, all of the capsules C conveyed through the groove are aligned with their caps located in an upward direction. In the case of this conventional alignment device, however, a plurality of the capsules are conveyed through the groove under the condition that they are in contact with one another and are thereby pushed by the following capsules. This potentially causes the capsules to interfere with one another, thereby causing them to fall from the groove.

SUMMARY OF THE INVENTION

The present invention broadly relates to a device for aligning articles in a selected direction while also locating their heads either forwardly or backwardly relative to that direction. The preferred articles are capsules which are intended to be contained in the filters of cigarettes and which have different diameters at their heads and tails. The object of the present invention is therefore to provide a device capable of aligning the articles with high reliability and at high speed.

A device of the present invention has a drum shaped like a thin disk, arranged on a plane along the conveyance path of the articles and rotates about a horizontal shaft. A groove is formed on and along the circumference of the drum and has a width larger than the diameter of the body of the capsule but smaller than that of the cap. The circumferential groove also has a depth larger than the length of the body.

The device of the present invention also has feed-in and feed-out conveyor systems. A plurality of the capsules having their caps directed both forwardly and backwardly can be conveyed by the feed-in conveyor system in such a way that they are all aligned in the conveyance direction. The capsules conveyed by this feed-in conveyor system are transmitted onto an uppermost circumferential portion of the drum. The capsules fed onto the drum are thus conveyed by the rotation of the drum by means of their caps being supported by both side rims of the groove with their bodies suspended in the groove.

The feed-out conveyor system has an endless belt passing through the groove on the circumference of the drum and running in the same direction as the rotation direction of the drum. The capsules which hang in the groove of the drum are carried by the rotating drum and come nearer to the belt when the drum is rotated. When the capsules are about to be transferred onto the belt, the lower ends of the capsule bodies are relatively urged in a backward direction by the belt so that all of them are aligned on the belt with their caps located in a forward direction. When the running speed of the belt is greater than the circumferential speed of the drum, all of the capsules may conversely be aligned on the belt with their bodies located in a forward direction.

According to the alignment device of the present invention, the capsules fed from the feed-in conveyor system onto the drum are carried on a circular line at an uppermost portion of the circumference of the drum and are then transferred onto the feed-out conveyor system with their caps located in either a forwardly or backwardly direction. The peripheral speed of the drum can thus be set relatively high independently of the number of capsules supplied to the drum. Therefore, the plural capsules which hang in the groove of the drum can be sufficiently separated from one another as to prevent them from interfering with adjacent capsules. Further, when the diameter of the drum is large, the conveyance pattern along which they are carried be means of the groove has a large radius of curvature. They can thus be carried essentially along a linear path from the feed-in conveyor system to the feed-out conveyor system without an abrupt change in direction. This makes it easy to increase the speed of the alignment device. In addition, the alignment device is simple in construction, which enables the device to be operated with high reliability and at high speed.

Additional objects and advantages of the invention will be set forth in the description which follows, and in part will be evident from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 6:
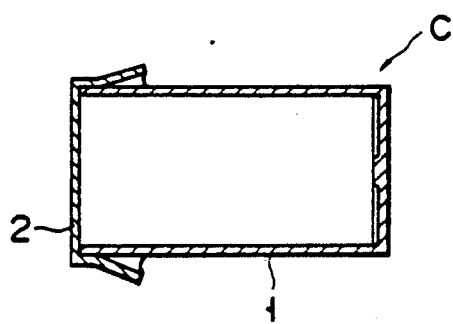
FIG. 6 is a vertically-sectioned view showing a capsule which is an example of matters processed by the alignment device of the present invention.

An example of the alignment device according to the present invention will be described with reference to the drawings. The alignment device is intended to align the above-mentioned capsules C shown in FIG. 6 in a selected direction. More specifically, it is intended to direct a plurality of the capsules C which are supplied with their heads directed both forwardly and backwardly relative to their direction of movement in such a way that their heads are directed in a common direction either forwardly or backwardly relative this direction.

Figure 1:
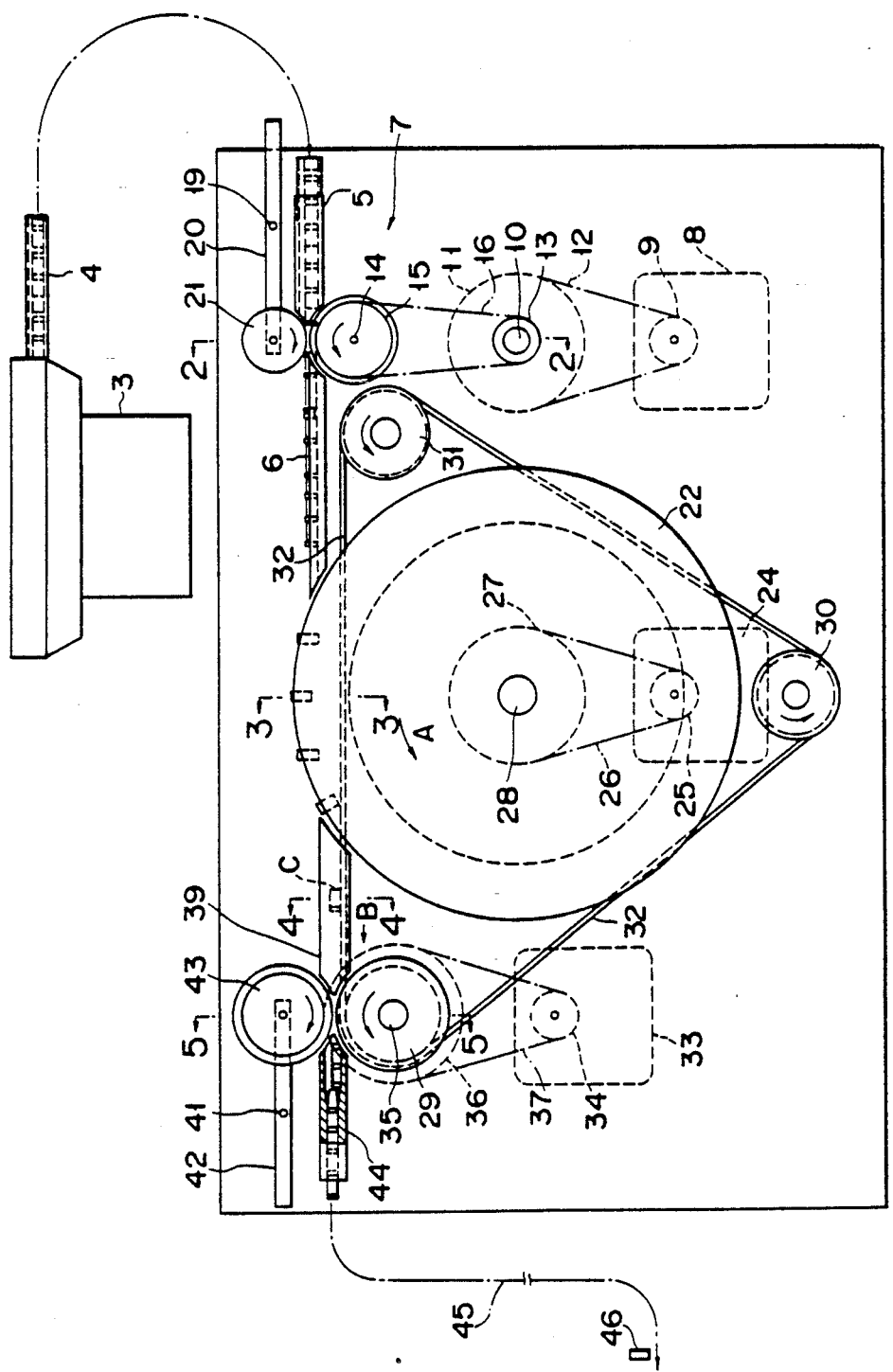
FIG. 1 is a side view showing an example of the alignment device according to the present invention.

Reference numeral 3 in FIG. 1 represents a feeder from which a plurality of the capsules C are supplied. These capsules C are aligned in a direction and supplied in a random manner such that some caps 2 and bodies 1 are directed forwardly. In short, some of them are supplied with their caps 2 directed forward while the other are supplied with their bodies 1 directed forward. The capsules C supplied from the feeder 3 in this manner are conveyed through a pipe 4 and a guide tube 5. The pipe 4 and the guide tube 5 have the same inner diameter so that the capsules C can be smoothly transmitted from the pipe 4 into the guide tube 5.

Figure 2:
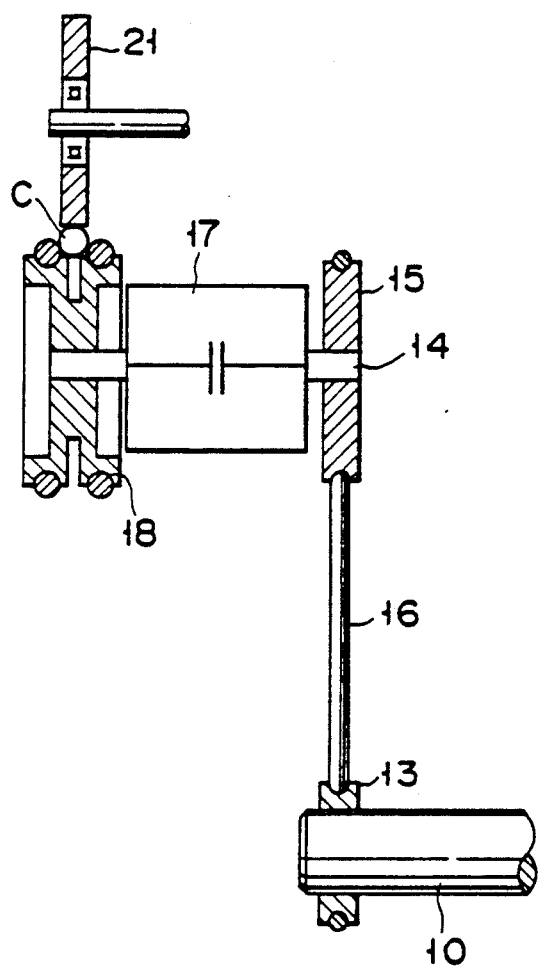
FIG. 2 is a sectional view taken along a line 2—2 in FIG. 1.

The alignment device is provided with a feed-in conveyor which includes a supply roller system 7. The capsules C fed to the guide tube 5 are further fed to a conveying guide member 6 through the supply roller system 7. As shown in FIG. 2, the supply roller system 7 has feed and floating rollers 18 and 21, respectively. The floating roller 21 is freely rotatably supported by an arm 20, which is pivotal about rod 19 so as to pivot in a plane perpendicular to a body of the device. Therefore, the floating roller 21 is pressed from above onto the circumference of the feed roller 18 by its own weight. The feed roller 18 is connected to a variable-speed motor 8 through an electromagnetic clutch 17, a shaft 14, a pulley 15, a belt 16, a shaft 10, a pulley 11, a belt 12 and a pulley 9. The feed roller 18 is thus driven by the motor 8 through a line of these transmitting components. The capsules C fed from the guide tube 5 are presently held between the feed roller 18 and the floating roller 12 and fed to the conveyor 6 by the rotating feed roller 18.

The conveying guide member 6 is shaped like a groove and the capsules C are aligned in the groove in the axial direction of the member 6 and conveyed with the forward capsules C pushed by the following ones.

Figure 3:
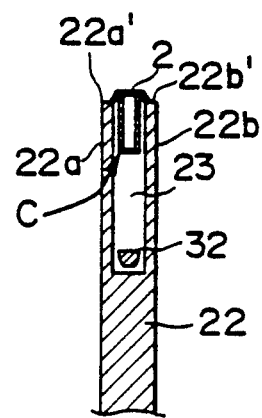
FIG. 3 is a sectional view taken along a line 3—3 in FIG. 1.
Figure 4:
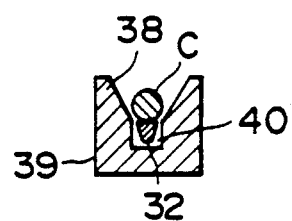
FIG. 4 is a sectional view taken along a line 4—4.
Figure 5:
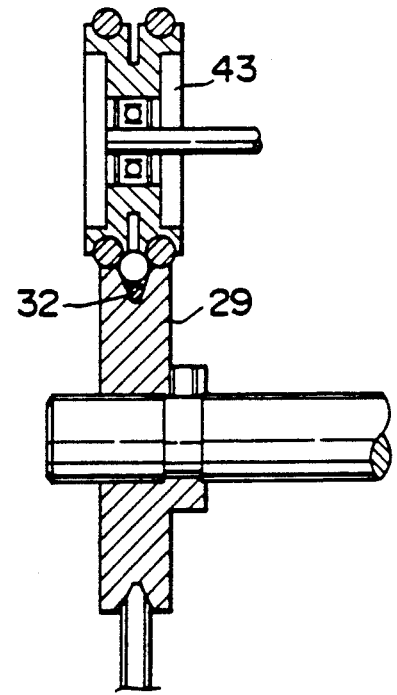
FIG. 5 is a sectional view taken along a line 5—5 in FIG. 1.

The alignment device is also provided with a drum 22, which is like a disk and arranged along the vertical plane. A horizontal shaft 28 is attached to the center of the drum 22, which is driven by a variable-speed motor 24 through the shaft 28, a pulley 27, a belt 26 and a pulley 25. A groove 23 is formed along the circumference of the drum 22 between a pair of spaced apart rims 22a, 22b, as shown in FIG. 3. The groove 23 has a width larger than the outer diameter of the body 1 of the capsule C but smaller than that of the cap 2 thereof. The circumference of the drum 22 has a rough finish to prevent the capsules C from sliding thereon.

The front end of the conveying guide member 6 is located adjacent to the upper portion of the circumference of the drum 22. The capsules C are therefore successively transferred from the front end of the conveyor 6 onto the upper circumference portion of the drum 22. The capsules C thus transferred are moved by the rotating drum 22 in such a way that they hang in the groove 23 on the circumference of the drum 22 with their caps 2 being supported by the circumferential edges of both side rims 22a, 22b of the groove 23 while their bodies 1 are suspended in the groove 23 by their own weight. The caps 2 are thus automatically turned upright.

The alignment device is further provided with a feed-out conveyor which includes a belt 32. This belt 32 is stretched like a triangle along three pulleys 29, 30 and 31, passing through the groove 23 at the upper portion of the drum 22. The underside of the belt 32 is separated from the bottom of the groove 23, and the width of the belt 32 is smaller than that of the groove 23 so that both sides of the groove 23 do not contact the belt 32, as shown in FIG. 3.

One of the three rollers (i.e. roller 29) also serves as a feed-out roller and it is driven, as seen in the case of the feed-in roller 18, by a variable-speed motor 33 through a shaft 35, a pulley 36, a belt 37 and a pulley 34. A floating roller 43, similar to the floating roller 21, is located above the feed-out roller 29. The floating roller 43 is supported by an arm 42 and freely rotatably pivoted on rod 41. The floating roller 43 is thus pressed onto the feed-out roller 29 by its own weight. The belt 32 is guided in grooves each formed on the circumference of each of the rollers 29, 30 and 31.

A feed-out guide member 39 is located opposite to the feed-in conveyor 6 with the drum 22 interposed therebetween. The feed-out guide member 39 includes a feed-out groove 38 having a tapered section, and another groove 40 which projects downwardly from the bottom of the groove 38. The belt 32 runs in the groove 40.

The running speed of the belt 32 is set lower than the circumferential speed of the drum 22 in this case. The capsules C which hang in the groove 23 on the circumference of the drum 22 with their caps 2 supported by both side rims 22a, 22b of the groove 23 are carried by the rotating drum 22 in the circumferential direction of the drum and then onto the belt 32. The lower end of the body 1 of each of the capsules, in this case, contacts the upper face of the belt first, but because the running speed of the belt 32 is less than the circumferential speed of the drum 22, the capsule C is transferred onto the belt 32 with its cap 2 located in a forward direction. In short, all of the capsules C are successively transferred onto the belt 32 by the rotating drum 22 with their caps 2 located forwardly.

The capsules C thus transferred onto the belt 32 are guided by the feed-out guide member 39 and fed into a cap-folding pipe 44 by the feed-out roller 29. The inner diameter of the pipe 44 becomes smaller at a position halfway along the length of the pipe 44. Thus, when the capsules C pass through the smaller-diameter portion of the pipe 44, their caps 2 are closely pressed onto their bodies 1 at their lower end portions. They are then fed, through a conveying tube 45, to another device (not shown) where the next process step is conducted. Numeral 46 denotes a sensor which detects the capsules C fed from the alignment device.

Although the running speed of the belt 32 is preferably selected so as to be less than the peripheral speed of the drum in the above-described case, it may also be selected to be at a higher relative speed. When the belt speed is higher, the capsules C are transferred onto the belt 32 with their caps 2 located backwardly.

It should be understood that the present invention is not limited to the above-described embodiment and that various changes and modifications can be made without departing from the scope and spirit of the present invention.

What is claimed is:

1. A device for aligning rod-like articles which have different diameters at their heads and tails in a selected direction and for orienting their said heads forwardly relative to said selected direction, said device comprising:

a drum mounted for rotation in a plane along a path of conveyance of said articles, said drum including a pair of spaced-apart side rims each having a circumferential edge, said side rims defining therebetween a circumferential groove in said drum having a width larger than the diameter of the tails of said articles but smaller than the diameter of the heads thereof, and a depth greater than the length of the tails;

a feed-in conveyor means for successively supplying the articles onto an uppermost circumferential portion of said drum in such a manner that the articles are suspended by said drum during rotation thereof with their heads being dependently supported by means of said circumferential edges of said side rims with their respective tails hanging downwardly into said groove defined between said side rims;

feed-out conveyor means for receiving the articles conveyed from said feed-in conveyor means by said drum, said tails of said articles hanging in the groove on the uppermost circumferential portion of the drum being contacted first by the feed-out conveyor means, and wherein said feed-out conveyor means includes a belt which is stretched along plural pulleys and passes through the groove at the uppermost circumferential portion of the drum such that the articles are transferred to said belt by said rum, and wherein said belt operates at a slower speed as compared to the peripheral speed of the drum to provide means which causes said heads of said articles to be oriented forwardly relative to said tails.

2. The alignment device according to claim 1, wherein said feed-in conveyor means includes a feed roller and a floating roller between which the articles are held while being conveyed towards said drum, and wherein said feed-out conveyor means includes a feed roller and a floating roller between which the articles are held while being conveyed away from said drum.

3. The alignment device according to claim 1, wherein both of said feed-in and feed-out conveyor means include feed rollers and floating rollers, wherein one of the pulleys along which the belt is stretched also serves as a feed-out roller, and wherein the articles are fed while being held between the feed rollers and the floating rollers.

4. An alignment device for aligning along a path of conveyance elongate articles having a dimensionally enlarged end and a tail extending from said enlarged end, and for orienting the articles along the path of conveyance such that the enlarged ends of each said article are oriented in a common direction relative to said path of conveyance, said alignment device comprising:

a rotatable drum including a pair of lateral spaced-apart rims each having a circumferential edge and which define therebetween a groove having a width which is smaller than said enlarged ends of said articles and a depth which is sized and configured to accept the entire length of said tails of said articles;

feeding means for sequentially feeding said articles to an inlet position on an uppermost circumferential portion of said drum such that said enlarged ends of each said article are dependently supported under their own weight by laterally opposing portions of said circumferential edges of said pair of side rims with the respective tails of each said article hanging downwardly into said groove, said supported articles being conveyed to a discharge position by rotation of said drum; and discharge means having a conveyor belt which extends through said groove at said uppermost circumferential portion of said drum and intercepts said discharge position, said conveyor belt movable at a selected linear speed for sequentially removing said articles from said drum when said articles are presented to said discharge position by rotation of said drum, and for conveying said articles to a downstream location, wherein said tails of said articles contact said conveyor belt of said discharge means at said discharge position in advance of said enlarged ends thereof; and wherein said drum is rotatable at a predetermined peripheral speed which is different from said selected linear speed of said conveyor belt, said different linear and peripheral speeds providing means which cause said enlarged ends of each of said articles to be moved relative to said respective tails of each of said article in a direction when said articles are discharged from said drum so as to be oriented in the same direction relative to said path of conveyance.

5. A device as in claim 4, wherein said discharge means includes a floating roller which presses the articles against the said conveyor belt after being discharged from said rotatable drum.

6. A device as in claim 4, wherein said feeding means includes a floating roller which presses the articles against said feeding means when being fed into said rotatable drum.

* * * * *